United States Patent [19]

Yokoe et al.

[11] Patent Number: 4,704,657

[45] Date of Patent: Nov. 3, 1987

[54] MULTILAYER CERAMIC CAPACITOR AND PROCESS FOR PREPARATION THEREOF

[75] Inventors: Nobuo Yokoe; Takashi Okawa, both of Kokubu, Japan

[73] Assignee: Kyocera Corporation, Kyoto, Japan

[21] Appl. No.: 832,142

[22] Filed: Feb. 24, 1986

[51] Int. Cl.⁴ .................. H01G 1/00; H01G 7/00; H01B 1/06

[52] U.S. Cl. .................. 361/321; 252/521; 29/25.42

[58] Field of Search ............ 29/25.42; 361/320, 321; 252/521; 264/61; 501/134–138; 156/89

[56] References Cited

U.S. PATENT DOCUMENTS

| | | | |
|---|---|---|---|
| 2,883,290 | 4/1959 | Planer et al. | 361/321 X |
| 3,755,723 | 8/1973 | Short | 361/321 |
| 4,027,209 | 5/1977 | Maher | 29/25.42 X |
| 4,055,850 | 10/1977 | Prakash | 361/321 X |
| 4,082,906 | 4/1978 | Amin et al. | 361/320 |
| 4,377,840 | 3/1983 | Nair | 361/320 |

*Primary Examiner*—Donald A. Griffin
*Attorney, Agent, or Firm*—Spensley, Horn, Jubas & Lubitz

[57] ABSTRACT

In a multilayer ceramic capacitor comprising internal electrodes of an Ag-Pd alloy, by incorporating 0.05 to 0.7%, by weight of Ag into a ceramic dielectric layer, the equivalent series resistance can be reduced and the capacitance can be increased. Incorporation of Ag in the dielectric layer can be accomplished by adding $Ag_2O$ into a green sheet of the dielectric material in advance or by firing a green sheet of the dielectric material in a powder containing $Ag_2O$.

20 Claims, No Drawings

MULTILAYER CERAMIC CAPACITOR AND PROCESS FOR PREPARATION THEREOF

BACKGROUND OF THE INVENTION

1. Field of the Invention

The present invention relates to a multilayer ceramic capacitor comprising internal electrodes composed of a silver-palladium alloy and a process for the preparation thereof. More particularly, the present invention relates to an improvement of the multilayer ceramic capacitor in which the equivalent series resistance is reduced and the capacitance is increased.

2. Description of the Prior Art

A commercially available mulitlayer ceramic capacitor has a structure in which a plurality of thin ceramic dielectric layers having internal electrodes formed on the surfaces thereof are laminated and integrally sintered and the internal electrodes are alternately connected in parallel to a pair of electrodes for the external connection formed on the side faces of the sintered assembly.

Recently, in some of such ceramic capacitors, a silver-palladium alloy (Ag-Pd) is used instead of palladium (Pd), which is a noble metal customarily used for internal electrodes, so as to reduce the cost of the internal electrode material.

However, if the content of silver (Ag) is low, the specific resistance of the silver-palladium alloy (Ag-Pd) is high and since silver (Ag) is evaporated during the sintering, the absolute amount of the metal forming the electrode is reduced and a net-like electrode film is formed to increase the sheet resistance to increase the equivalent series resistance (ESR) of the capacitor. Therefore, the capacitor cannot be used for a high-frequency circuit.

It may be considered that the specific resistance will be reduced by increasing the content of silver (Ag) in the silver-palladium alloy (Ag-Pd). However, if the content of silver (Ag) is increased, the melting point of the metal is lowered, and a stable mulilayer ceramic capacitor cannot be obtained. Moreover, for preventing formation of a short circuit, which is due to migration of atoms between the electrodes by an electric field, the increase of the ratio of silver (Ag) is limited. For compensation of silver (Ag) evaporated during the sintering, the amount of silver (Ag) coated and applied to the surface of a green sheet of a dielectric material may be increased. However, this results in structural defects of the multilayer ceramic capacitor (cracking or delamination) and the ceramic capacitor cannot be put into practical use.

SUMMARY OF THE INVENTION

We found that in the above-mentioned multilayer ceramic capacitor comprising dielectric ceramic layers and silver-palladium internal electrodes, if a predetermined amount of silver is incorporated into the dielectric ceramic layers in the state dispersed in the interior of the dielectric ceramic layers, the equivalent series resistance (ESR) of the capacitor can be reduced without causing structural defects in the entire capacitor or the internal electrodes and simultaneously, the capacitance can be increased.

Furthermore, we found that if silver oxide is dispersed in a dielectric material composition in preparing a green sheet of a dielectric ceramic material and this green sheet is fired or if a green sheet of a dielectric ceramic material is fired in a silver-containing saturated atmosphere, silver can be dispersed in a predetermined amount in a dielectric ceramic body.

In accordance with one aspect of the present invention, there is provided a multilayer ceramic capacitor comprising dielectric ceramic layers and internal electrodes of a silver-palladium alloy, wherein the dielectric ceramic material contains 0.05 to 0.7% by weight of silver dispersed therein.

In accordance with another aspect of the present invention, there is provided a process for the preparation of a multilayer ceramic capacitor, which comprises incorporating silver oxide in a dielectric ceramic composition, forming the resulting composition into a green sheet, coating the green sheet with a paste containing a silver-palladium alloy, laminating said paste-coated green sheets and firing the laminated sheets to form a laminate comprising dielectric ceramic layers containing 0.05 to 0.7% by weight of silver dispersed therein and internal electrodes of a silver-palladium alloy.

In accordance with still another aspect of the present invention, there is provided a process for the preparation of a multilayer ceramic capacitor, which comprises forming a dielectric ceramic composition into a green sheet, coating the green sheet with a paste containing a silver-palladium alloy, laminating said paste-coated green sheets and firing the laminate in the state surrounded by a silver-containing saturated atmosphere to form a laminate comprising dielectric ceramic layers containing 0.05 to 0.7% by weight of silver dispersed therein and internal electrodes of a silver-palladium alloy.

DETAILED DESCRIPTION OF THE PREFERRED EMBODIMENT

In the present invention, any of dielectric ceramic materials that can be sintered at a low temperature of 1000° to 1080° C., have a large dielectric constant and have been customarily used for multilayer capacitors may be optionally used as the dielectric ceramic material. As appropriate examples, there can be mentioned dielectric materials shown in the examples given hereinafter, and dielectric materials composed mainly of $Pb(Fe_{\frac{1}{2}}Nb_{\frac{1}{2}})O_3$, $Pb(Mg_{\frac{1}{3}}Nb_{\frac{2}{3}})O_3$, $Pb(Fe_{\frac{2}{3}}W_{\frac{1}{3}})O_3$, $Pb(Mg_{\frac{1}{2}}W_{\frac{1}{2}})O_3$, $Pb(Zn_{\frac{1}{3}}Nb_{\frac{2}{3}})O_3$ and $PbTiO_3$, which can be sintered at a low temperature as described above.

A vitreous component capable of becoming liquid under firing conditions may be incorporated into the dielectric composition so as to improve the low-temperature sintering property. This vitreous component may be incorporated in an amount of 0.5 to 8.0% by weight in the dielectric composition.

In the present invention, silver is contained in an amount of 0.05 to 0.7% by weight, especially 0.35 to 0.69% by weight, based on the dielectric ceramic material in the state dispersed in the dielectric ceramic material. By incorporating the above-mentioned amount of silver in the dielectric material, the equivalent series resistance of the multilayer capacitor comprising silver-palladium alloy internal electrodes can be reduced and the capacitance can be increased. More specifically, if silver (Ag) is incorporated in the dielectric material, evaporation of silver of the silver-palladium alloy (Ag-Pg) constituting the internal electrode can be controlled. If the content of silver (Ag) in the dielectric material is smaller than 0.05% by weight, no substantial effect of controlling the evaporation of silver (Ag) can be attained and the equivalent series resistance cannot be reduced, and furthermore, the dielectric constant is below the range specified in the present invention. If the silver content exceeds 0.7% by weight, the temperature coefficient of the capacity is outside the range of ±30 ppm/°C., and the capacitor cannot be used for a high-frequency capacitor because the stability is insufficient.

In the present invention, the following two means may be adopted for incorporating the above-mentioned amount of silver in the dielectric ceramic material in the dispersed state. The first means comprises incorporating silver oxide in a dielectric ceramic composition and forming the resulting mixture into a green sheet. Not only silver oxide but also a silver compound capable of being converted to silver oxide or silver under firing conditions, such as silver nitrate or silver chloride, may be used as the starting silver material. However, in order to avoid the contamination of the dielectric ceramic material, silver oxide is most preferred. The mount of silver oxide to be incorporated in the ceramic composition depends on the firing conditions and is not generally defined. In short, silver oxide should be incorporated in such an amount that silver is contained in the above-mentioned amount in the dielectric ceramic material after the firing. Namely, the preparation of green sheets and the firing of laminates of green sheets are carried out while changing the amount incorporated of silver oxide, the amount of silver left and contained in the dielectric layers is measured, and the necessary amount of incorporated silver oxide is determined from the relation between the amount incorporated of silver oxide and the amount of silver left in the dielectric layer. It is generally preferred that silver oxide be incorporated in an amount of 0.5 to 2.0% by weight based on the dielectric composition, though the preferred amount differs to some extent according to the firing conditions.

Silver oxide may be homogeneously and uniformly incorporated into the dielectric compositon according to the wet pulverization method using a ball mill or the like.

The preparation of a green sheet is accomplished by dispersing the above-mentioned dielectric composition and silver oxide in an appropriate dispersion medium, if necessary together with a dispersant, a defoaming agent, a plasticizer, an organic binder and the like, coating the resulting forming composition in a predetermined thickness on a substrate such as a resin film and drying the coating according to need. It is preferred that the thickness of the green sheet be 20 to 50 $\mu$m, especially 25 to 35 $\mu$m, though the preferred thickness differs to some extent according to the characteristics of the dielectric material.

A paste containing a silver-palladium alloy is coated on the so-formed green sheet by such means as printing. An alloy containing silver and palladium at a weight ratio of from 60/40 to 90/10, especially from 70/30 to 75/25, is used as the silver-palladium alloy. It is preferred that the amount coated of the silver-palladium alloy be 2.0 to 2.3 mg/cm$^2$. The coating paste can be obtained by dispersing a powder of the above-mentioned alloy in a solution containing an organic binder.

A predetermined number of the paste-coated green sheets are laminated, and several green sheets not coated with the paste are piled on the laminate and the assembly is pressed. The formed laminate is cut into a predetermined size to form green chips. This cutting operation is preformed in such a manner that the paste-coated layers are exposed on both the cut edges alternately.

The obtained green chips are fired in air under such conditions that the dielectric composition is sintered and integrated. It is preferred that the firing temperature be 900° to 1080° C.

In accordance with another embodiment of the present invention, a laminate is prepared in the same manner as described above except that silver oxide is not incorporated in the dielectric composition, and the obtained laminate is firing in the state surrounded by a silver-containing saturated atmosphere. In this case, silver contained in the atmosphere diffuses in the dielectric layers in the laminate to form sintered dielectric layers containing silver in the interior thereof. For formation of the silver-containing saturated atmosphere surrounding the laminate, there is advantageously adopted a method in which a silver oxide-containing powder, which is chemically stable to the firing product, is packed in a vessel and the laminate is embedded in the powder and fired in the sealed vessel. A powder composiiton formed by incorporating a powder of silver oxide into a powder which is not active for the laminate under the firing conditions, such as alumina powder or zirconia powder, is advantageously used as the silver oxide-containing powder. It is preferred that the content of silver oxide in the powder be 3 to 8% by weight.

The present invention will now be described in detail with reference to the following examples that by no means limit the scope of the invention.

EXAMPLE 1

A basic composition was prepared by adding 0.50% by weight of $B_2O_3$, 2.50% by weight of $SiO_2$ and 2.50% by weight of ZnO to a mixture comprising 22.6% by weight of $BaTiO_3$ having a purity higher than 98.5%, which was prepared from equimolar amounts of $BaCO_3$ and $TiO_2$ at 1200° C. according to the solid phase synthesis method, 31.6% by weight of $Nd_2O_3$ having a purity higher than 98%, 35.5% by weight of titanium dioxide (anatase) having a purity higher than 97.5%, 4.71% by weight of $Bi_2O_3$ having a purity higher than 95% and 5.59% by weight of $Pb_3O_4$ having a purity higher than 95%. A powder of $Ag_2O$ of the reagent class was added to the basic composition in an amount corresponding to the amount of added silver, shown in Table 1. The resulting mixture was charged into a porcelain pot having an inner capacity of 1.6 l together with alumina balls (17 mm in diameter) having a bulk volume of 0.8 l (1.5 kg), and a dispersant, a defoaming agent, an organic binder, a plasticizer and toluenee as the dispersion medium were added to the mixture. The resulting mixture was milled at 72 rpm for 24 hours. The obtained starting slip was formed into green sheets having a thickness of 25 $\mu$m according to the doctor blade method. Then, 25 green sheets were piled and hot-pressed to form a green formed plate. The formed plate was cut into a green square plate having a side of about 10 mm and a thickness of about 0.50 mm. The green square plate was placed in a mortar formed of $Al_2O_3$ and fired at 1050° C. for 2 hours. Silver electrodes were baked on the entire upper and lower surfaces of the obtained square plate having a side of about 8 mm and a thickness of about 0.4 mm. Thus, samples 1 through 6 for evaluation of the dielectric characteristics, shown in Table 1, were prepared. With respect to each of the so-obtained samples 1 through 6, the capacitance (PF) was measured at a frequency of 1 MHz and an input level of 1 Vrms, and the quality factor (Q) (according to JIS, it is specified that the value Q should be at least 1000) and the temperature coefficient of the capacity in the temperature range of from −55° to +125° C. were determined. Furthermore, the dielectric constant (εr) of the dielectric ceramic material was fired from the results of the measurement of the capacitance. The obtained data of the dielectric constant as well as those of the quality factor (Q) and temperature coefficient of the capacity are shown in Table 1. Incidentally, the content of silver (Ag) in the dielectric material shown in Table 1 is the value obtained by the atomic absorption spectroscopy.

TABLE 1

| | Sample No. | | | | | |
|---|---|---|---|---|---|---|
| | 1 | 2 | 3 | 4 | 5 | 6 |
| Amount Added of Ag (% by weight) | 0 | 0.1 | 0.2 | 0.5 | 1.0 | 2.0 |
| Ag Content (% by weight) | 0.006 | 0.007 | 0.016 | 0.050 | 0.281 | 0.596 |
| Dielectric Constant εr | 68.0 | 67.9 | 68.0 | 72.6 | 79.3 | 79.8 |
| Quality Factor Q | 2700 | 2600 | 2600 | 2600 | 2700 | 2500 |
| Temperature Coefficient of the Capacity ppm/°C. | −18 | −13 | −15 | −10 | −8 | −13 |

In case of samples 4 through 6, the amount of silver (Ag) added to the dielectric material is selected within the range of 0.5 to 2.0% by weight and the content of silver (Ag) in the dielectric material is 0.0.5 to 0.596% by weight. In each of these samples, the dielectric constant (εr) is at least 72.6, the quality factor (Q) is at least 2600 and the temperature coefficient of the capacity (ppm/°C.) is within a range of ±30 ppm/°C. Accordingly, it is seen that each of these samples is satisfactory in the characteristics required for the dielectric material of a multilayer ceramic capacitor. Furthermore, the dielectric constant (εr) of samples 4 through 6 is at least 72.6 and is much higher than the dielectric constant (εr) of sample 3, which is 68.0. The reason of this improvement has not been completely elucidated. However, it is construed that the growth of crystals of neodymium titanate ($Nd_2O_3 2TiO_2$) will be selectively controlled by the presence of Ag.

EXAMPLE 2

A green sheet having a thickness of 25 μm, which was prepared in the same manner as described in Example 1, was printed with a paste comprising an alloy consisting of 70% by weight of silver (Ag) and 30% by weight of palladium (Pd), an organic binder and a solvent by using a square pattern having an effective area of about 1 mm². Two green sheets having the so-formed printed film were piled, and 10 green sheets having no printed film were piled on each of the top and bottom of the piled sheets. The piled sheet assembly was hot-pressed and cut into green chips having a length of about 2.5 mm and a width of about 1.5 mm. Each of the green chips forming a mulitlayer ceramic capacitor was placed in an alumina mortar and firing in air at 1050° C. for 2 hours, and take-out electrodes of a silver palladium alloy (Ag-Pd) were baked to both the ends. Thus, samples 7 through 12 shown in Table 2 were obtained.

With respect to each of these samples, the capacitance and temperature coefficient of the capacity were measured at a frequency of 1 MHz and the equivalency series resistance was measured at a frequency of 900 MHz. The measurements were carried out by using an LCR meter and an impedance analyzer. The content of silver (Ag) in the dielectric material was determined according to the XMA method (X-ray microanalyzer method). The results of the measurements are shown in Table 2.

TABLE 2

| | 7* | 8* | 9* | 10 | 11 | 12 |
|---|---|---|---|---|---|---|
| Amount (% by weight) of Ag Added | 0 | 0.1 | 0.2 | 0.5 | 1.0 | 2.0 |
| Ag Content (% by weight) | 0.01 | 0.01 | 0.02 | 0.06 | 0.35 | 0.60 |
| Capacitance (PF) | 20.08 | 19.98 | 20.56 | 25.33 | 26.01 | 26.80 |
| Temperature Coefficient of the Capacity (ppm/°C.) | −9 | −11 | −8 | −4 | +1 | −19 |
| Equivalent Series Resistance (mΩ) | 2430 ± 320 | 2570 ± 380 | 1870 ± 290 | 283 ± 63 | 173 ± 11 | 162 ± 7 |

Note
*outside the scope of the invention

Samples 7 through 12 are prepared by laminating dielectric materials of samples 1 through 6 obtained in Example 1, respectively. By this lamination, the content of silver (Ag) is increased to 0.01 to 0.60% by weight. In each of these samples, the temperature coefficient of the capacity is within the range of ±30 ppm/°C., but in samples 7 through 9 where the content of silver (Ag) is lower than 0.05% by weight, the equivalent series resistance is at least 1870±290 mΩ, while the equivalent series resistance is not higher than 283±63 mΩ in samples 10 through 12 where the content of silver (Ag) is higher than 0.05% by weight. Accordingly, although the capacitance is not higher than 20.56 PF in samples 7 through 9, the capacitance is improved and at least 25.33 PF in samples 10 through 12. Each of samples 7 through 9 and 10 through 12 is cut and the internal electrodes between dielectric layers are observed. It is found that in samples 10 through 12, the thickness of internal electrodes between dielectric layers is sufficient as compared with the thickness in samples 7 through 9. Thus, it can be confirmed that evaporation of silver (Ag) during the firing can be controlled according to the present invention.

EXAMPLE 3

In order to obtain dielectric materials having a silver (Ag) content higher than that of samples 6 and 12 obtained in Examples 1 and 2, it is necessary to increase the amount added of silver (Ag) in proportion to the increase of the silver content. However, this increase of the silver content becomes saturated even if the amount added of silver is increased above a certain level. Therefore, a powder mixture comprising 100 parts by weight of $Al_2O_3$ and 5.0 parts by weight of $Ag_2O$ (4.65 parts by weight of Ag) was placed in a lidded vessel formed of $Al_2O_3$, and sample 1 obtained in Example 1 was embedded in the powder mixture and fired at 1050° C. for 2 hours in the closed state. In the same manner as described in Example 1, silver (Ag) electrodes were baked to the formed square plate to form a square plate capacitor, which is designated as sample 13.

Sample 13 was evaluated in the same manner as described in Example 1. The obtained results are shown in Table 3. Incidentally, the content of silver (Ag) in the dielectric material was determined by the atomic absorption spectroscopy.

TABLE 3

|  | Sample 13 |
| --- | --- |
| Ag Content (% by weight) | 0.70 |
| Capacitance | 80.8 |
| Quality Factor Q | 2600 |
| Temperature Coefficient of the Capacity (ppm/°C.) | −27 |

The dielectric material having a silver (Ag) content of 0.70% by weight is characterized by a dielectric constant ($\epsilon r$) of 80.8, a quality factor (Q) of at least 1000 and a temperature coefficient of the capacity (ppm/°C.) included in the range of ±30 ppm/°C., and the dielectric material is satisfactory in these properties.

EXAMPLE 4

The multilayer ceramic capacitor chip of sample 7 or 12 obtained in Example 2 was embedded in the powder mixture of $Al_2O_3$ and $Ag_2O$ described in Example 3 and fired at 1050° C. for 2 hours, and chips of a silver-palladium alloy (Ag-Pd) were baked as take-out electrodes to both the ends. Thus, samples 14 and 15 were obtained. These samples were evaluated in the same manner as described in Example 2. The obtained results are shown in Table 4. With respect to each sample, the content of silver (Ag) in the dielectric material was determined according to the XMA method in the same manner as described in Example 2.

TABLE 4

|  | Sample 14 | Sample 15* |
| --- | --- | --- |
| Amount (% by weight) of Added Ag | 0 | 2.0 |
| Ag Content (% by weight) | 0.69 | 0.74 |
| Capacitance (PF) | 27.96 | 29.11 |
| Temperature Coefficient of the Capacity (ppm/°C.) | −23 | −47 |
| Equivalent Series Resistance (mΩ) | 158 ± 6 | 152 ± 10 |

Note
*outside the scope of the present invention

The silver (Ag) content of sample 14 is 0.69% by weight, which is included in the range specified in the present invention, and the equivalent series resistance of this sample is 158±6 mΩ, which is much lower than those of samples 7 through 9 which are outside the scope of the present invention. Furthermore, the capacitance of this sample is 27.96 PF and is sufficient, and the temperature coefficient of the capacity is −23 ppm/°C., which is included in the range (±30 ppm/°C.) specified in the present invention.

In contrast, the silver (Ag) content of sample 15 is 0.74% by weight, which exceeds the upper limit (0.70% by weight) of the range specified in the present invention. In this sample, the equivalent series resistance (mΩ) and capacitance (PF) are satisfactory, but the temperature coefficient of the capacity is −47 ppm/°C. and outside the predetermined range (±30 ppm/°C.).

As is apparent from the foregoing description, in a multilayer ceramic capacitor comprising internal electrodes composed of a silver-palladium alloy (Ag-Pd), if silver (Ag) is incorporated in the ceramic dielectric material in an amount of 0.05 to 0.70% by weight according to the present invention, the equivalent series resistance (ESR) of the dielectric material can be reduced and the capacitance can be improved. Therefore, according to the present invention, a multilayer ceramic capacitor that can be used even in a high-frequency circuit can be provided at a low cost.

We claim:

1. A process for the preparation of a multilayer ceramic capacitor, which comprises the steps of;
   forming a dielectric ceramic composition into green sheets;
   coating the green sheets with a paste containing a silver-palladium alloy;
   laminating said paste-coated green sheets one on top of another; and
   firing the laminate in a silver-containing saturated atmosphere to form a laminate comprising dielectric ceramic layers containing silver dispersed therein and internal electrodes of the silver-palladium alloy.

2. A process according to claim 1, wherein the silver-containing saturated atmosphere is formed by embedding the laminate in a powder containing silver oxide.

3. A process for the preparation of a multilayer ceramic capacitor as in claim 1, wherein the fired dielectric ceramic layers contain 0.05 to 0.7% by weight silver.

4. A multilayer ceramic capacitor, comprising:
   a plurality of dielectric ceramic layers consisting essentially of a dielectric ceramic composed of $BaTiO_3$, $Nd_2O_3$, $TiO_2$, $Bi_2O_3$, PbO, $B_2O_3$, $SiO_2$ and ZnO, said layers containing dispersed silver; and
   at least one silver-palladium alloy electrode between said layers.

5. A multilayer ceramic capacitor, comprising:
   a plurality of dielectric ceramic layers consisting essentially of a dielectric ceramic composed of $BaTiO_3$, $Nd_2O_3TiO_2$, $Bi_2O_3$, PbO, $B_2O_3$, $SiO_2$ and ZnO, said layers containing dispersed silver; and
   at least one silver-palladium alloy electrode between said layers, wherein the dispersed silver in said ceramic layers is in the form of silver oxide.

6. A multilayer ceramic capacitor as in claim 5, wherein said dispersed silver in said ceramic layers is 0.05 to 0.7% by weight of said layers.

7. A process for making a multilayer ceramic capacitor, comprising the steps of:
   incorporating a material selected from the group consisting of silver metal and silver compounds into a first ceramic composition consisting essentially of a dielectric ceramic composed of $BaTiO_3$, $Nd_2O_3$, $TiO_2$, $Bi_2O_3$, PbO, $B_2O_3$, $SiO_2$ and ZnO;
   forming said first composition into a plurality of green ceramic sheets;
   coating the green ceramic sheets with a second composition containing silver and palladium;
   laminating said coated green ceramic sheets one on top of another; and
   firing the laminated ceramic sheets.

8. The process of claim 7, wherein said silver compound in said first ceramic composition is silver oxide.

9. The process of claim 7, wherein the amount of said silver compound incorporated into said first ceramic composition is adjusted so that the ceramic sheets contain 0.05 to 0.7% by weight silver after firing.

10. A process for making a multilayer ceramic capacitor, comprising the steps of:
   forming a first ceramic composition into green ceramic sheets;
   coating the green ceramic sheets with a second composition containing silver and palladium;
   laminating said coated green ceramic sheets one on top of another; and
   firing the laminated ceramic sheets in a silver-containing atmosphere to form a laminate of alternating silver-containing ceramic sheets and silver-palladium alloy electrodes.

11. The process of claim 10, wherein the firing time and temperature are adjusted so that the ceramic sheets contain 0.05 to 0.7% by weight silver after firing.

12. A multilayer ceramic capacitor comprising dielectric ceramic layers and internal electrodes of a silver-palladium alloy, wherein the dielectric ceramic layers consist essentially of (i) a dielectric ceramic composed of $BaTiO_3$, $Nd_2O_3$, $TiO_2$, $Bi_2O_3$, PbO, $B_2O_3$, $SiO_2$ and ZnO, and (ii) 0.05 to 0.7 percent by weight of silver dispersed therein.

13. A capacitor as set forth in claim 12, wherein the silver-palladium alloy is an alloy comprising silver and palladium at a weight ratio of silver to palladium of from 60/40 to 90/10.

14. A process for the preparation of a multilayer ceramic capacitor, which comprises the steps of:
   incorporating silver oxide in a dielectric ceramic composition composed of $BaTiO_3$, $Nd_2O_3$, $TiO_2$, $Bi_2O_3$, PbO, $B_2O_3$, $SiO_2$ and ZnO;
   forming the resulting composition into green sheets;
   coating the green sheets with a paste containing a silver-palladium alloy;
   laminating said paste-coated green sheets one on top of another; and
   firing the laminated sheets to form a laminate comprising dielectric layers containing 0.05 to 0.7 percent by weight of silver dispersed therein and internal electrodes of a silver palladium alloy.

15. A process according to claim 14, wherein the silver oxide is incorporated in the dielectric composition in an amount of 0.5 to 2.0 percent by weight.

16. A process for the preparation of a multilayer ceramic capacitor as in claim 14, wherein the fired dielectric ceramic layers contain 0.05 to 0.7 percent by weight silver.

17. A multilayer ceramic capacitor comprising: dielectric ceramic layers consisting essentially of (i) a dielectric ceramic composed of $BaTiO_3$, $Nd_2O_3$, $TiO_2$, $Bi_2O_3$, $Pb_3O_4$, $B_2O_3$, $Si_2O$ and ZnO, and (ii) silver dispersed in the dielectric ceramic, wherein the silver is in a form selected from the group consisting of silver metal and silver oxide; and
   silver-palladium alloy electrodes on the dielectric ceramic layers.

18. A capacitor as set forth in claim 17, wherein the dielectric ceramic comprises about 22.6 percent by weight $BaTiO_2$, about 31.6 percent by weight of $Nd_2O_3$, about 35.5 percent by weight of $TiO_2$, about 4.71 percent by weight of $Bi_2O_3$, about 5.59 percent by weight of $Pb_3O_4$, about 0.5 percent by weight of $B_2O_3$, about 2.5 percent by weight of $SiO_2$ and about 2.5 percent by weight of ZnO.

19. A capacitor as set forth in claim 17, wherein the dispersed silver amounts to 0.05 to 0.7 percent by weight silver of the ceramic layers.

20. A process for the preparation of a multilayer ceramic capacitor, comprising the steps of:
   (i) incorporating, into a dielectric ceramic composition, a material selected from the group consisting of silver, silver oxide and silver compounds capable of being converted into silver or silver oxide when fired, said dielectric ceramic composition including, $BaTiO_3$, $Nd_2O_3$, $TiO_2$, $Bi_2O_3$, $Pb_3O_4$, $B_2O_3$, $SiO_2$ and ZnO;
   (ii) forming the resulting composition into green sheets;
   (iii) coating the green sheets with a silver-palladium alloy;
   (iv) laminating said coated green sheets one on top of another; and
   (v) firing the laminated sheets.

* * * * *